B. F. PAINE.
Running-Gear.
No. 68,646.
Patented Sept 10, 1867.
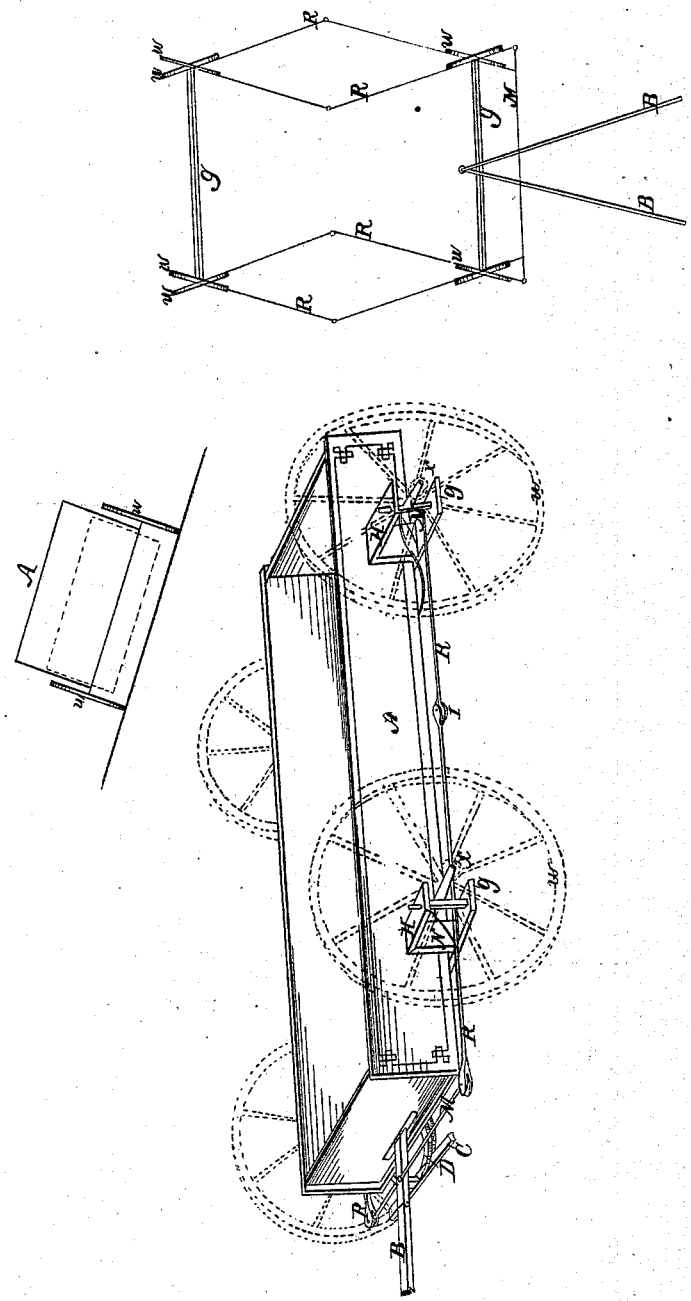
Witnesses
J. B. Gulinberger,
B. W. Paine.
Inventor;
B. F. Paine

United States Patent Office.

B. F. PAINE, OF ROSEVILLE, ILLINOIS.

Letters Patent No. 68,646, dated September 10, 1867.

IMPROVEMENT IN RUNNING-GEAR FOR VEHICLES.

*The Schedule referred to in these Letters Patent and making part of the same.*

TO ALL WHOM IT MAY CONCERN:

Be it known that I, B. F. PAINE, of Roseville, in the county of Warren, and State of Illinois, have invented a new and useful Manner of Constructing the Running-Gears of Four-Wheeled Vehicles of all descriptions, and applicable to either horse or steam-power; and I do hereby declare the following to be a full, clear, and exact description of the construction and operation of the same, reference being had to the annexed drawings, making a part of this specification, in which—

Figure 1 is a perspective view.

Figure 2 is a plan of the bottom; and

Figure 3 a diagram for illustrating the difference from the common wagon on sidling ground.

To enable others skilled in the art to make and use my invention, I proceed to the following more full description.

I construct my bed or body in any of the usual forms. Transversely with the bed, I place the bottom plates $g\ g$, extending out from side of bed sufficient to receive the arm H in a manner to receive the vertical axle N, from which I project the spindle $x$ for the wheels, the wheels all being attached to the wagon in a similar manner, and all being given a revolving movement on the vertical axle N. The tongue I attach by pivot, either inside of the bed, and passing out through a slot, or else under the bed; and I construct the tongue with a joint just forward of the double-tree, to admit of vertical movement. Across the tongue and pivoted to it I place the rod M. By a flexible joint I attach to the rod M the rod R, running alongside of bed and fastened solid to the axle N. About half way between the wheels I connect the rod R to another similar rod by the flexible joint I. This last rod fastens solid to the hind axle N. This last device gives the power, as seen at fig. 2, of throwing the hind and front wheels in opposite directions by the same movement of the tongue, and thus enabling the driver to turn on a very short space. It also, in connection with the tongue, as arranged, takes off nearly all the jam on horses shoulders, which accompanies the ordinary wagon.

The advantage over the ordinary wagon on inclined ground will be seen at fig. 3, where a rear plan is given of an ordinary wagon with the body entirely above the centre of the wheels; and my improvement is shown with the body several inches below the centre of the wheels, thus taking, as will be plainly seen, the weight or rather great strain from the lower wheels.

Placing the tongue in the direction of the yellow one, fig. 2, will give the rods R and wheels $w$ the directions and positions seen by the yellow shade, and turning the tongue in the other direction will give the positions to wheels and rods seen by the red shade.

This arrangement affords a great deal cheaper wagon than the old style, enables the manufacturer to make all the wheels of a height, and with sufficiently high wheels to gain greatly in draught; still have body low enough to load with convenience, and run easier and steadier on account of flexibility in wheel attachments.

What I claim as my invention, and desire to secure by Letters Patent, is—

1. The bed-plate $g$, in combination with the arm H, axle N, and spindle X, constructed as described, and for the purpose set forth.

2. The jointed tongue B, pivoted to the bed as described.

3. The rod M, in combination with the rods R, tongue B, and axle N, substantially as described and for the purpose set forth.

B. F. PAINE.

Witnesses:
   J. B. GILENBERGER,
   B. W. PAINE.